United States Patent
Rozdilsky et al.

[15] 3,699,719
[45] Oct. 24, 1972

[54] ULTRASONIC MACHINING

[72] Inventors: Nicholas Rozdilsky, 92 Middle River Road, Danbury; Hans J. Wilkens, Cold Spring Drive, Fairfield, both of Conn. 06810

[22] Filed: Jan. 25, 1971

[21] Appl. No.: 109,452

[52] U.S. Cl. ..................51/59 SS, 51/292, 51/328
[51] Int. Cl. ........................B24b 1/00, B24b 31/00
[58] Field of Search...51/59 SS, 281, 317, 59 R, 292, 51/328; 408/17, 700

[56] References Cited

UNITED STATES PATENTS

| | | | |
|---|---|---|---|
| 2,791,066 | 5/1957 | Mahlmeister | 51/59 SS |
| 2,942,383 | 6/1960 | Brown et al. | 51/59 SS |
| 3,094,814 | 6/1963 | Barke et al. | 51/59 SS |
| 2,388,610 | 11/1945 | Hanemann | 408/17 |
| 2,764,967 | 10/1956 | Cupler | 408/17 |

Primary Examiner—Donald G. Kelly
Attorney—Ervin B. Steinberg

[57] ABSTRACT

The speed of ultrasonic abrasive slurry machining is improved by providing alternate periods during which the vibrating tool while urged against the workpiece is active and inactive.

8 Claims, 2 Drawing Figures

PATENTED OCT 24 1972 3,699,719
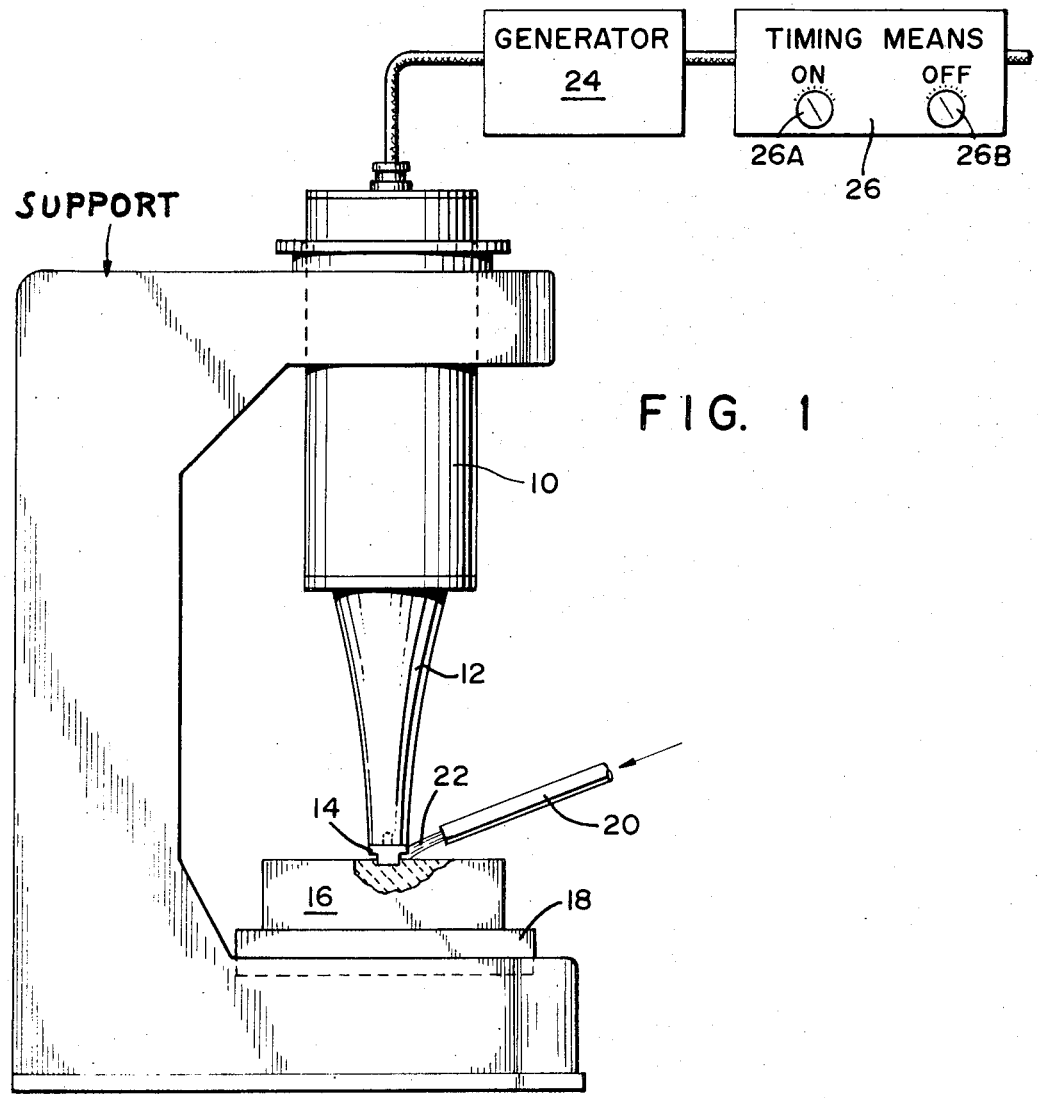
FIG. 1
FIG. 2
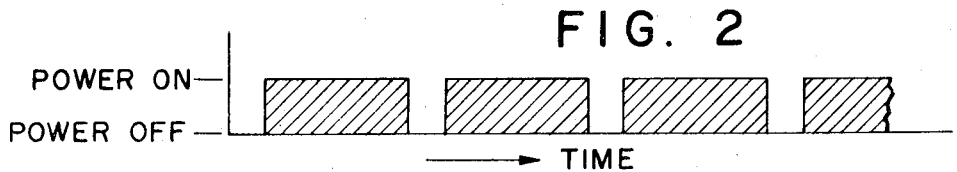
Nicholas Rozdilsky
Hans J. Wilkens
INVENTORS.
BY:
Erwin B. Steinberg

ULTRASONIC MACHINING

This invention refers to ultrasonic machining and more specifically has reference to improvements in ultrasonic abrasive slurry machining, also known as ultrasonic impact grinding.

Ultrasonic slurry machining has been disclosed in U.S. Pat. No. 2,580,716 issued to L. Balamuth dated Jan. 1, 1952 entitled "Method and Means for Removing Material from a Solid Body" and is described also in Ultrasonic Engineering (book) by Julian R. Frederick, John Wiley & Sons, Inc., New York, New York (1965) pages 171 to 183.

The ultrasonic abrasive slurry machining process involves the use of an ultrasonically vibrating tool which is in contact with or slightly spaced from a workpiece. Abrasive particles suspended in a fluid are fed into the gap between the tool and the workpiece and are driven with a percussive impact against the workpiece. The high velocity impact of the particles on the workpiece causes an abrading action which is used for producing accurate odd-shape holes and recesses in hard materials, such as carbides, ceramics, glass, and semi-conductors.

The present invention concerns an improvement wherein higher speeds of machining or penetration are achieved than those which have been experienced heretofore. Specifically, it has been discovered that by cycling the ultrasonically vibrating tool in such a manner as to alternate active and inactive periods, greatly increased cutting speeds are obtained. In one typical instance, the cutting speed was increased by approximately 100 percent.

One of the principal objects of this invention is therefore, the provision of a new and improved method and apparatus for ultrasonic abrasive slurry machining.

Another important object of this invention is the provision of a method and apparatus for increasing the cutting speed of ultrasonic abrasive slurry machining.

A further object of this invention is the provision of an ultrasonic abrasive slurry machining apparatus which includes means for providing alternate cycles during which the ultrasonically vibrating tool is active and substantially inactive.

Further and still other objects of this invention will be more clearly apparent from the following specification when taken in conjunction with the accompanying drawing, in which:

FIG. 1 is an illustration of a typical machining apparatus, and

FIG. 2 is a timing diagram for explaining the improvement provided by the present invention.

Referring now to the figures and FIG. 1 in particular, numeral 10 refers to a converter unit adapted to receive electrical high frequency energy and provide vibrations in the ultrasonic frequency range. The converter includes typically piezoelectric or magnetostrictive means for converting the electrical energy to mechanical vibrations. A converter suitable for this purpose is shown in U.S. Pat. No. 3,328,610 issued to S. E. Jacke et al. dated June 27, 1967 entitled "Sonic Wave Generator". The converter 10 is fitted with a tool cone 12 also called horn, resonator or amplitude transducer for amplifying the vibrations and transmitting them to the workpiece or to the abrasive slurry. The tool 12 is dimensioned to be resonant at the frequency of sound traveling longitudinally therethrough and for this purpose is dimensioned to form a half wavelength resonator. The frontal surface of the tool 12 is fitted with a replaceable cutting tool or tool bit 14 which penetrates into a workpiece 16.

The workpiece 16 rests on a platform 18 which is urged toward engagement with the tool bit 14 by a counterweight or a spring. The engagement pressure is light, usually in the range from ten to several hundred grams. Alternatively, the platform 18 may be fixed and the transducer mounted for slight engagement pressure using a mechanical or a fluid-operated balancing means. A tubing 20 directs an abrasive slurry 22 driven by a pump (not shown) toward the interface between the tool bit 14 and the workpiece 16. It will be apparent that the front surface of the tool 12 may form the tool bit rather than a replaceable piece 14.

The converter 10 is energized via a cable with high frequency electrical energy from an electrical generator or power supply 24 which is controlled by a timing means 26. The timing means has two controls 26A and 26B for varying the duration of the ON and OFF periods. The ON and OFF periods alternate.

The operation of the abrasive slurry machine, as is well understood by those skilled in the art, comprises energizing the converter 10 which causes the tool 12 to resonate and thereby being rendered active, feeding abrasive particle slurry 22 toward the interface between the tool 14 and the workpiece, and providing slight engagement pressure with the workpiece. The ultrasonic energy produces extremely high accelerating forces which drive the abrasive particles to impact upon the workpiece. This repetitive, high speed, impact erodes the workpiece and the tool sinks into the workpiece.

It has been discovered that improved cutting rates are obtained by means of the timing means which is connected to the generator 24. The timing means provides alternate periods during which the power is applied to the generator and periods during which the generator is OFF. In a typical example, for instance, it was found that when the timer was adjusted to provide ON periods of 4/10 second duration alternated by OFF periods of 1/10 second duration a substantial increase in the cutting rate, approximately 100 percent, was achieved. It was noted that when the ON cycle starts a "blast" effect is visible which occurs at the frontal surface of the tool 14. It appears that this effect removes excess debris from the work area, permitting new slurry to reach the cleaned working area. This improved effect was noted when cutting into aluminum oxide as well as when cutting into glass, using either a round bar tool 12 or one having a catenoidal taper.

It is well known that the optimum machining rates are influenced by several factors, making it necessary to experiment with various slurries and other parameters as are described in the Frederick reference supra. Similarly, some experimentation is necessary to determine favorable cycling rates, that is, the length of the respective ON and OFF periods which alternate in sequence. FIG. 2 shows a typical alternating ON and OFF cycle rate provided by the timing means.

The same improvement was noted also by using a variable transformer control and cyclically varying by manual means the voltage applied to the generator 24.

Rather than completely de-energizing the converter 10, the same beneficial effect was noted by decreasing the amplitude of oscillation in a cyclic manner, i.e. periodically rendering the tool 12 substantially inactive and then rapidly increasing the power to restore the high excursional amplitude at the frontal surface of the tool. Therefore, the word "inactive" as used herein shall denote a significant decrease of the vibrational amplitude of the tool compared to that which prevails during the operating cycle. Hence, the tool does not need to be completely de-energized during the inactive period. It will be apparent that the timing means 26 may comprise merely a modulating means which provides a time responsive variation of the signal applied to the generator 10.

The present method, moreover, obviates the need for periodically withdrawing the tool and reinserting it into the workpiece to provide for the region being machined to be flushed. The instant arrangement accomplishes the same function completely automatically, at a faster rate, and without human intervention.

It will be apparent, therefore, that the present invention constitutes a significant advance in the art and achieves an effect which produces a greatly improved machining operation.

What is claimed is:

1. A method of ultrasonic machining comprising:
   positioning an ultrasonic tool adjacent a workpiece;
   urging contact between said tool and workpiece;
   supplying an abrasive slurry between the tool and workpiece to cause abrading machining of said workpiece by said tool, and
   periodically vibrating the tool at its resonant frequency for predetermined spaced intervals of time while said tool is urged into contact with the workpiece to provide successive periods in which the tool is rendered alternately active and inactive thereby to substantially increase the cutting speed of the tool.

2. The method claimed in claim 1 wherein the active periods of the tool are of equal time duration.

3. The method claimed in claim 2 wherein the inactive periods of the tool are also of equal time duration.

4. The method claimed in claim 1 wherein the active periods of the tool are of longer time duration than the inactive periods thereof.

5. The method claimed in claim 3 wherein the active periods of the tool are of longer time duration than the inactive periods thereof.

6. An ultrasonic machining apparatus comprising:
   electro-acoustic means to receive electrical energy and provide vibrations in the ultrasonic frequency range;
   a tool coupled to said electro-acoustic means to receive said vibrations;
   means urging said tool into mechanical contact with a workpiece;
   means for providing an abrasive slurry between said tool and workpiece for abrading machining of said workpiece by said tool, and
   control means coupled to said electro-acoustic means operable to periodically vibrate the tool at its resonant frequency for predetermined spaced intervals of time while said tool is urged into contact with the workpiece to provide successive periods in which the tool is rendered alternately active and inactive thereby to substantially increase the cutting speed of the tool.

7. Apparatus as claimed in claim 6 wherein the control means includes timing mechanism operable to provide active tool periods of equal time duration and inactive tool periods of equal time duration.

8. Apparatus as claimed in claim 7 wherein the timing mechanism is operable to selectively vary the time durations of the active and inactive periods of the tool respectively.

* * * * *

UNITED STATES PATENT OFFICE
CERTIFICATE OF CORRECTION

Patent No. 3,699,719    Dated October 24, 1972

Inventor(s) Nicholas Rozdilsky, et. al.

It is certified that error appears in the above-identified patent and that said Letters Patent are hereby corrected as shown below:

On the cover sheet insert -- [73] Assignee: Branson Instruments, Incorporated, Stamford, Conn. -- .

Signed and sealed this 20th day of March 1973.

(SEAL)
Attest:

EDWARD M. FLETCHER, JR.
Attesting Officer

ROBERT GOTTSCHALK
Commissioner of Patents